United States Patent
Sepeck, III

(10) Patent No.: US 7,434,818 B1
(45) Date of Patent: Oct. 14, 2008

(54) ONE-HAND OPERATION CONVERSION KIT FOR WHEELBARROW HANDLES

(76) Inventor: Stephen Walter Sepeck, III, 2676 N. Emerald Dr., Dayton, OH (US) 45431

( * ) Notice: Subject to any disclaimer, the term of this patent is extended or adjusted under 35 U.S.C. 154(b) by 172 days.

(21) Appl. No.: 11/158,977

(22) Filed: Jun. 23, 2005

(51) Int. Cl.
*B62B 1/24* (2006.01)

(52) U.S. Cl. ............... 280/47.26; 280/655; 280/47.315; 280/657; 280/47.18; 280/47.33; 280/654

(58) Field of Classification Search ... 280/47.18–47.26, 280/653–656, 346, 350, 47.315, 657, 47.33; 414/346, 350
See application file for complete search history.

(56) References Cited

U.S. PATENT DOCUMENTS

| | | | | |
|---|---|---|---|---|
| 4,740,008 | A | * | 4/1988 | Johnson ........................ 280/475 |
| 4,789,171 | A | * | 12/1988 | Porter ....................... 280/47.18 |
| 5,087,061 | A | * | 2/1992 | Wallace ......................... 280/30 |
| D329,726 | S | | 9/1992 | Loveless |
| 5,149,116 | A | * | 9/1992 | Donze et al. ............. 280/47.26 |
| 5,458,356 | A | * | 10/1995 | Fedorko et al. ........... 280/418.1 |
| 5,758,887 | A | * | 6/1998 | Bobst ........................ 280/47.31 |
| 5,915,706 | A | * | 6/1999 | Mosley ..................... 280/47.26 |

* cited by examiner

*Primary Examiner*—Christopher Ellis
*Assistant Examiner*—Cynthia F Collado
(74) *Attorney, Agent, or Firm*—Stephen W. Sepeck, III

(57) ABSTRACT

The "One-Hand Operation Conversion for Wheelbarrow Handles" added to a wheelbarrow, on one hand, offers single hand operability and maneuverability, and on the other hand offers added benefits to dual-handed users. The wheelbarrow can easily be converted from dual to single-handed operation and then back again with this said unit. This is completed by adding a centrally mounted handle to cross support(s) which are attached to the two longitudinally extending handles of the said wheelbarrow. When the center handle is attached, one-hand operation is achieved by the load balancing capabilities of the said handle and its mounting orientation. The center handle is formed into or mounted to the cross support(s) that are mounted to the existing longitudinal handles. The unit size dimensions and mounting method are arbitrary and will be made to fit the circumstances of mounting position and cross support material. The cross support(s) material and the handle material are of variable rigid form. The cross support mounts are variably rigid and can be adapted to fit the form of the said cross support(s) as well as conformed to the shape of the said wheelbarrows longitudinal handles. The cross support(s) offer the user a ergonomically padded contact area. This contact area can be used to apply a force by means of the lower body when the wheelbarrow is in use under heavy load.

5 Claims, 4 Drawing Sheets

ONE-HAND OPERATION CONVERSION KIT FOR WHEELBARROW HANDLES

FIELD OF THE INVENTION

The invention relates to a convertible vehicle for hauling material and in particular, a barrow-type vehicle which can be adapted by adding a handle system providing a single handle for usability and maneuverability of the said wheelbarrow.

PRIOR ART

Wheelbarrows are known to be either one wheeled or multi-wheeled devices with attached handlebars spaced apart and a storage compartment to carry objects. The operator using two hands to control the wheelbarrows exact movement is oriented behind and is pushing the said wheelbarrow. The wheelbarrow in resting position is supported by two legs located at the back of the said vehicle. The front of the vehicle is supported by either one or more wheels. The operator uses the two handles to lift and maneuver the wheelbarrow to other destinations. Such wheelbarrows have been adapted for easier use with two hands, but none have been accommodated for the operation and maneuverability with a single hand.

SUMMARY OF THE INVENTION

This invention eliminates the necessity for dual handed control of a single or multi-wheeled wheelbarrow. Wheelbarrows deal mainly with the transportation of materials (earth, blocks, etc.); in general the movement of mass amounts of material. The originally designed wheelbarrow handles require two-handed operation. The described system herein makes this two-hand operated wheelbarrow operable with one-hand. This said system deals with the wheelbarrows usability and maneuverability aspects and it will help disabled (arm paralysis, etc. . . . ) individuals with its operation. It will also make it easier for normal individuals to carry objects and maneuver the wheelbarrow by offering the user a free hand during operation. This invention adds a single handle operating system to the dual longitudinal handles protruding from the wheelbarrow. This centrally mounted handle can be padded and attaches to the cross support(s) that are affixed to the handles of the wheelbarrow using support mounts. The handle system itself is a convertible device which can be removed, folded, or pushed away into a storage compartment when normal, two-handed wheelbarrow operation is needed.

ADVANTAGES OF THE INVENTION

As can be easily seen, this invention offers the ability of usability. It gives an individual with limited mobility the chance to operate a mechanical device once only operable with two hands. This device not only offers a handle system for one-handed use, but it also provides cross support(s) that can be padded and used as a push bar for applying extra force using the lower body as needed to move heavy objects. The center handle can easily be attached and detached, folded and stored or pushed away when two-handed operation is a necessity. The cross support(s) offer the ability to control the load moment placed on them by their individual design characteristics, mounting placement and mounting hardware.

DETAILED DESCRIPTION OF THE DRAWINGS

Figure 1:
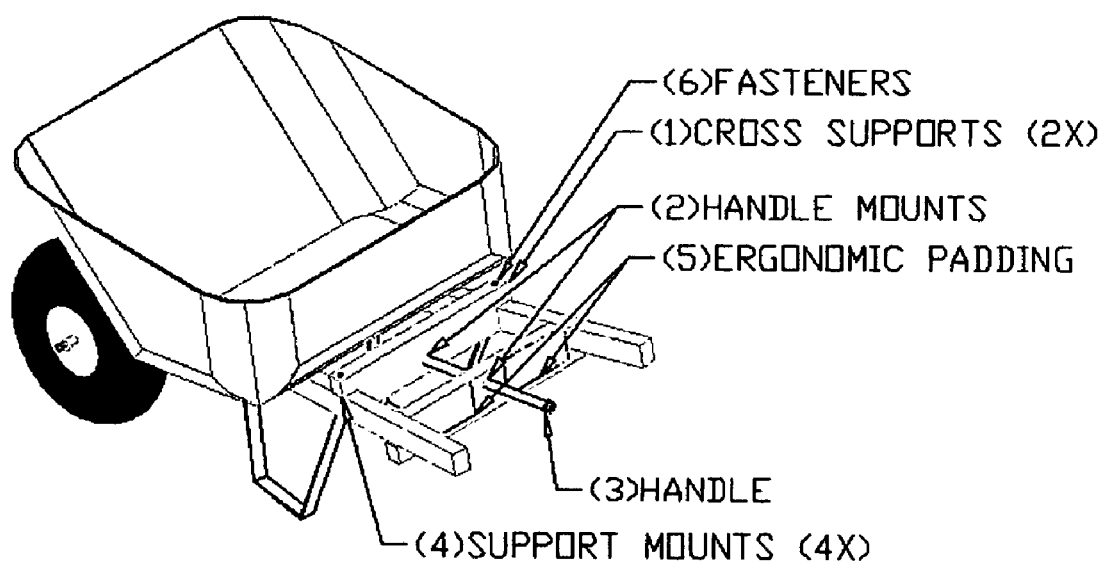
FIG. 1 is a detailed perspective left side view of the wheelbarrow with the dual cross support handle system installed.

FIG. 1 is a detailed perspective view of the wheelbarrow with the dual cross support system installed. The cross support system is shown mounted to the original handles supplied with the wheelbarrow. The (1)CROSS SUPPORTS are made of variable rigidity, can be scaled in size to withstand desired load requirements, can have (5)ERGONOMIC PADDING and are mounted arbitrarily with (4)SUPPORT MOUNTS to the wheelbarrows handles with (6)FASTENERS. The center (3)HANDLE is made of variable rigidity, can be scaled in size upon manufacture to withstand desired load requirements and is mounted to the cross supports with (2)HANDLE MOUNTS in a placement causing the load of the two wheelbarrow handles to be placed upon said center handle.

Figure 2:
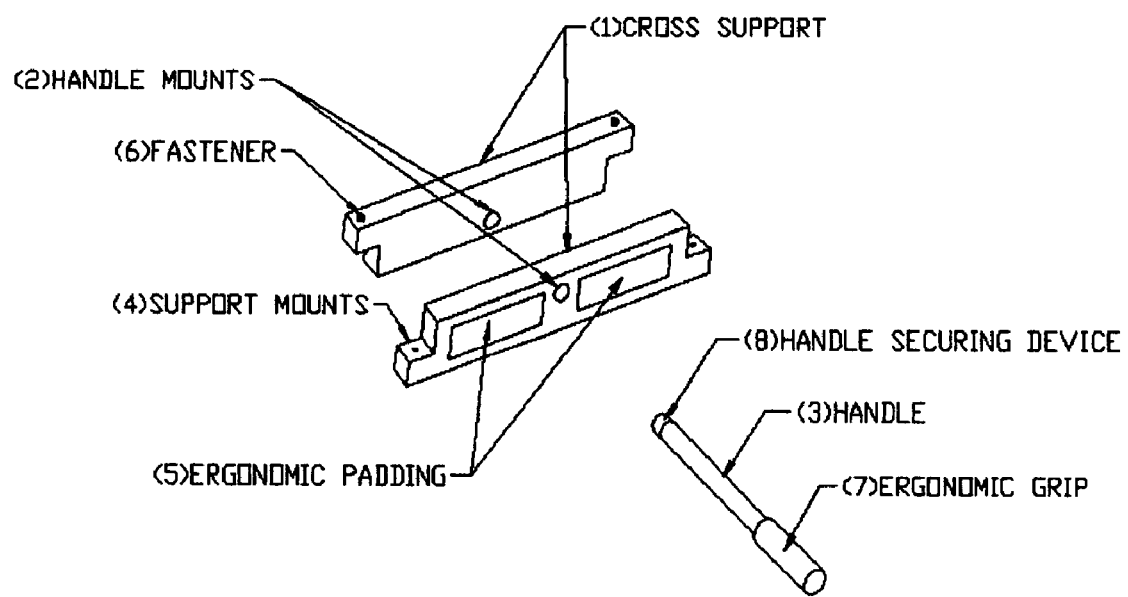
FIG. 2 is an unattached exploded and detailed perspective view of the dual cross support handle system.

FIG. 2 is a detailed isometric exploded view of the dual cross support system, this view shows the kit exploded and separated from the wheelbarrow handles. The (1)CROSS SUPPORTS are made of variable rigidity, can be scaled in size to withstand desired load requirements, can have (5)ERGONOMIC PADDING and are mounted arbitrarily with (4)SUPPORT MOUNTS to the wheelbarrows handles with (6)FASTENERS. The center (3)HANDLE is made of variable rigidity, can be scaled in size upon manufacture to withstand desired load requirements, is mounted to the cross supports with (2)HANDLE MOUNTS, secured in place with (8)HANDLE SECURING DEVICE, and can be configured with an (7)ERGONOMIC GRIP. The placement of the handle system causes the load of the two wheelbarrow handles to be placed upon said center handle.

Figure 3:
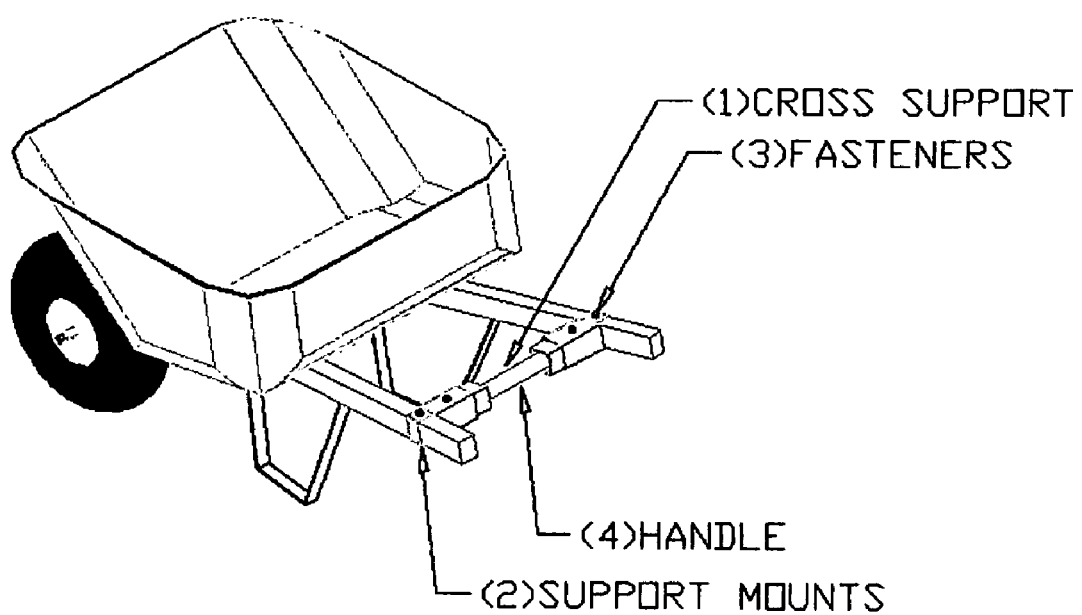
FIG. 3 is a perspective left side view of a wheelbarrow with a single cross support handle system installed.

FIG. 3 is a detailed perspective drawing of the wheelbarrow with the kit installed using a single cross support. The handle conversion kit is shown mounted to the original handles supplied with the wheelbarrow. The (1)CROSS SUPPORT is made of variable rigidity, can be scaled in size to withstand desired load requirements and it is fastened arbitrarily using (2)SUPPORT MOUNTS to the wheelbarrows handles with (3)FASTENERS. The center (4)HANDLE is formed into the said (1)CROSS SUPPORT.

Figure 4:
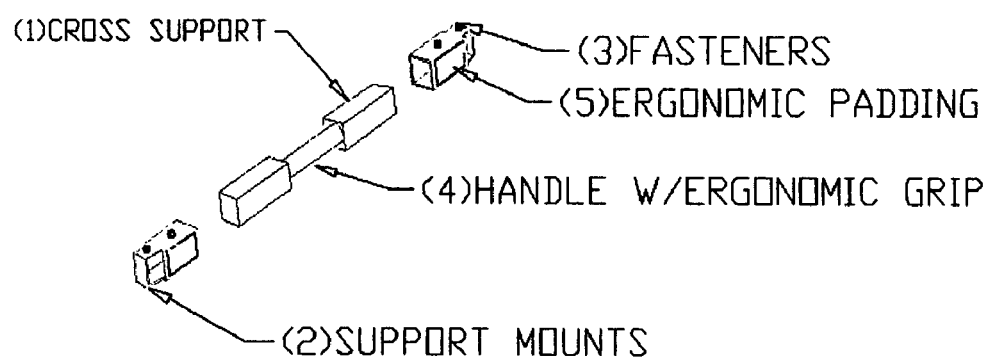
FIG. 4 is an unattached exploded and detailed perspective view the single cross support handle system.

FIG. 4 is a detailed isometric exploded view of the single cross support system, this view shows the kit exploded and separated from the wheelbarrow handles. The (1)CROSS SUPPORT is made of variable rigidity, can be scaled in size to withstand desired load requirements, can have (5)ERGONOMIC PADDING and is mounted arbitrarily with (2)SUPPORT MOUNTS to the wheelbarrows handles with (3)FASTENERS. The center (4)HANDLE is formed into the (1)CROSS SUPPORT, can be scaled in size upon manufacture to withstand desired load requirements, is mounted to the cross supports with (2)SUPPORT MOUNTS, is secured in place with (8)HANDLE SECURING DEVICE, and can be configured with an ERGONOMIC GRIP. The placement of the handle system causes the load of the two wheelbarrow handles to be placed upon said center handle.

102,376 to Dederick, P. K;
175,069 to Gandola, Frank V;
618,900 to Oakey, W. V;
676,163 to Victor, D;
961,719 to Hubbard, A. O;
1,095,145 to Elterich, D;
1,312,990 to Johnson, C. B;
1,516,856 to Johnson, C. B;
2,494,199 to Provitola, Anthony and Anna T;
2,660,446 to Edhardt, G. E;
2,672,348 to Scott, R. W;
3,262,713 to Crawford Sr, J;
3,404,427 to Mack, W. V;
4,230,329 to Johnson, Aldus;
4,252,334 to Filkins, Steven J;
4,270,786 to Mattox, McKinley;
4,444,405 to Barrus, Dwight M;
4,471,996 to Primeau, Mario;
4,666,170 to Vasa, Jiri;
4,740,008 to Johnson, James A;
4,758,010 to Christie, Howard C;
4,767,128 to Terhune, John J;
4,789,171 to Porter, Lynn L;
4,854,601 to Herndon, George W;
5,031,926 to Wannamaker, David D;
5,149,116 to Donze, et al;
5,305,843 to Armstrong, Leonard J;
5,350,030 to Mawhinney, et al;
5,458,356 to Fedorko, et al;
5,564,722 to Cimo, Richard T;
5,758,887 to Bobst, Glen L;
5,810,375 to Hoffarth, et al;
5,884,924 to Fairchild, et al;
5,906,381 to Hovatter, Steven;
5,915,706 to Mosley, Keith A;
5,924,708 to Bisaillon, et al;
6,017,053 to Leger, et al;
6,039,333 to Hamblin, Steven Lee;
6,065,555 to Yuki, et al;
6,161,850 to James, et al;
6,173,799 to Miyazaki, et al;
6,220,622 to Garcia, Guadalupe;
6,488,130 to Bermel, John Karl;
6,550,104 to Cacciacarne, Ernest D;
6,685,198 to Hartman, Donald Dewayne;
6,755,478 to Messinger-Rapport, Kenneth H;
6,820,880 to Benton, Nick Charles;
6,886,838 to Zimmerman, Felton;
6,908,088 to Feick, William Kurt;
6,945,545 to Celli, Giuliano;
7,032,718 to Lessard, Maurice;
7,077,404 to Groskreutz, Donald A;
7,121,565 to Lulay, Melvin F;
7,104,565 to Albert, et al;
7,134,675 to Carosi, et al.

The invention claimed is:

1. A wheelbarrow comprising:
a frame including an elongated pair of handles and a center handle, a pan attached to said frame, a cross support structure connected to said frame, said support structure further comprising two cross beams, one of said cross beams including an ergonomic pad, said pad allowing a user to thrust the wheelbarrow in an uphill or frontward path by placing a knee of said user against said pad.

2. The wheelbarrow recited by claim 1, wherein the center handle can be removable.

3. The wheelbarrow recited by claim 1, wherein the center handle is made to interchange with other handle designs.

4. The wheelbarrow recited by claim 1, wherein the center handle can be locked/unlocked in place with the cross beams.

5. The wheelbarrow recited by claim 1, wherein the cross support(s) can be designed as single or multiple members.

* * * * *